Patented July 1, 1941

2,248,018

UNITED STATES PATENT OFFICE 2,248,018

4-ARYL-PIPERIDINE-KETONES AND A PROCESS OF PREPARING THEM

Otto Eisleb, Hofheim in Taunus, Germany, assignor to Winthrop Chemical Company, Inc., New York, N. Y., a corporation of New York No Drawing. Application April 6, 1940, Serial No. 328,373. In Germany March 30, 1939

10 Claims. (Cl. 260—293)

The present invention relates to 4-aryl-piperidine-ketones and to a process of preparing them.

U. S. Patent No. 2,167,351 relates among others to 4-aryl-piperidine-4-carboxylic acid nitriles of the general formula

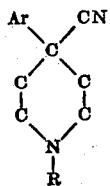

wherein Ar stands for aryl and R for a monovalent hydrocarbon radical

I have found that these nitriles may be transformed in an excellent yield into 4-aryl-piperidyl-4-ketones by reacting them with magnesium organic compounds and decomposing the intermediate products thus obtained with dilute acids. The reaction takes place according to the following scheme:

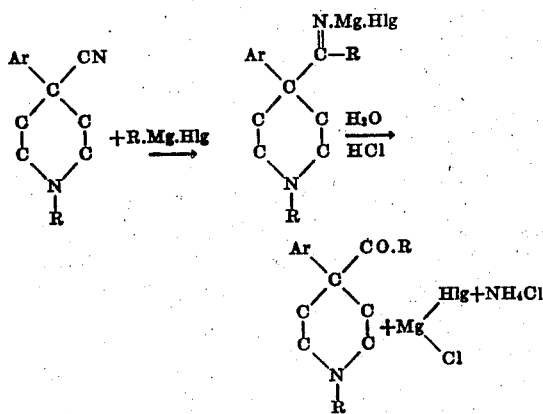

In the afore-given scheme Ar stands for an aryl radical, particularly for a phenyl radical, R stands for a hydrocarbon radical, particularly for an alkyl radical having 1 to 6 carbon atoms and Hlg stands for halogen.

As starting material there may be used for instance the 1-methyl-4-phenyl-piperidine-4-carboxylic acid nitrile and the 1-benzyl-4-phenyl-piperidine-4-carboxylic acid-nitrile.

The new compounds have the property not hitherto noticed in basically substituted ketones of being highly antispasmodic and acting as good anodyne remedies; they are, therefore, valuable remedies possessing at the same time a low toxicity.

The following examples serve to illustrate the invention, but they are not intended to limit it thereto, the parts being by weight:

1. 1-methyl-4-phenyl-piperidyl-4-methyl-ketone

A solution of methyl-magnesium iodide prepared from 71 parts of methyl iodide and 12 parts of magnesium turnings in 200 parts of ether is added to a solution of 80 parts of 1-methyl-4-phenyl-piperidine-4-carboxylic acid nitrile in 200 parts of toluene. The heat produced is not essential; when self-heating no longer occurs the mixture is heated on the water-bath at the descending condenser; the ether distils and the toluene solution is kept for 3 hours at the temperature of the water-bath. The decomposition occurs by pouring the solution on ice and stirring it with dilute hydrochloric acid of which such a quantity has to be applied that an acid reaction to Congo paper is maintained during the operation. A crystalline magma of 1-methyl-4-phenyl-piperidyl-4-methylketone-hydroiodide is obtained which is sparingly soluble in cold water, filtered with suction, washed with ether and recrystallized from hot water. The yield amounts to 83 parts of colorless crystals melting at 219° C. to 222° C. The base separated from the hot aqueous solution of the salt with potassium carbonate boils, after having been taken up in ether and dried over potassium carbonate, at 143° C. under a pressure of 3.5 mm. On cooling it solidifies; its solidification point is at 54° C. The base is rather readily soluble in water.

2. 1-methyl-4-phenyl-piperidyl-4-ethyl-ketone

A solution of ethyl-magnesium bromide prepared from 55 parts of ethyl bromide and 12 parts of magnesium in 200 parts of ether is added to a solution of, 80 parts of 1-methyl-4-phenyl-piperidine-4-carboxylic acid nitrile in 200 parts of toluene. The mixture is further treated as described in Example 1. During the decomposition with ice and hydrochloric acid no salt separates in the present case. The base is therefore precipitated in the form of an oil by supersaturating the solution which is just acid to Congo paper with ammonia; it is then taken up in ether, dried over potassium carbonate and distilled. Boiling point at 145° C. under a pressure of 3 mm. The yield amounts to 76 parts. The base is a colorless oil. The hydrochloride is a colorless crystalline powder melting at 170° C.; it readily dissolves in water. The crime-base constitutes colorless cubes of cyclohexane melting at 135° C. The oxime hydrochloride constitutes colorless crystals melting at 227° C. to 228° C.

3. 1-methyl-4-phenyl-piperidyl-4-phenyl-ketone

A solution of phenyl-magnesium bromide prepared from 78 parts of bromobenzene and 12 grams of magnesium in 200 parts of ether is added to 60 parts of 1-methyl-4-phenyl-piperidine-4-carboxylic acid nitrile; only a very slight self-heating occurs. An oil precipitates which on boiling the mixture in a reflux condenser soon solidifies and forms a crystalline mass. After having boiled the product for 3 hours it is decomposed with ice and hydrochloric acid. The salt solution acid to Congo paper which has been separated from the ether solution is precipitated with ammonia in excess. The base is taken up in ether, dried over potassium carbonate and distilled. Its boiling point is at 199° C. under a pressure of 4 mm. The base is a very viscous, very feebly yellowish oil and is readily soluble in petroleum ether and methyl alcohol. On addition of water it first precipitates from methyl alcohol in the form of an oil, but it soon solidifies as the hydrate. Its melting point is at 79° C.–80° C. On drying under reduced pressure over sulfuric acid the hydrate gives off its water again and melts. The hydrochloride is a colorless crystalline powder melting at 243° C. to 244° C. while assuming a dark coloration; it readily dissolves in water.

4. 1-methyl-4-phenyl-piperidyl-4-benzyl-ketone

A solution of benzyl magnesium chloride prepared from 64 parts of benzyl chloride and 12 parts of magnesium in 200 parts of ether is added to 80 parts of 1-methyl-4-phenyl-piperidine-4-carboxylic acid nitrile which has been dissolved in 200 parts of toluene. After the mixture has been boiled for 10 minutes in a reflux condenser the ether is distilled on the water bath and the solution of toluene is kept for 3 hours at the temperature of the water bath. The solution is then decomposed by pouring it on ice and adding hydrochloric acid until the reaction is constantly acid to Congo paper. A thick crystalline precipitate is produced consisting of the hydrochloride of ketone which after having been stirred for some time is filtered with suction, while cold, washed with ether and ice-cold water. After drying the product at 140° C. the yield amounts to 114 parts. The melting point is at 188° C.–190° C. The hydrochloride is hardly soluble in cold water but readily soluble in hot water, rather readily soluble in methyl alcohol and ethyl alcohol. The base precipitated from the aqueous solution of the salt with ammonia rapidly solidifies; it melts at 53° C. to 55° C.

5. 1-benzyl-4-phenyl-piperidyl-4-ethyl-ketone

A solution of ethyl-magnesium-bromide prepared from 12 parts of magnesium and 55 parts of ethyl bromide in 300 parts of ether is added to a solution of 83 parts of 1-benzyl-4-phenyl-piperidine-4-carboxylic acid nitrile in 100 parts of toluene. The ether is then distilled on the water bath and the residue is kept for 3 hours at the temperature of the water bath. On decomposing the residue with ice and hydrochloric acid a thick crystalline magma of the ketone-hydrochloride is obtained, which after having been filtered with suction, washed with water and recrystallized from alcohol is obtained in a yield of 88 parts. The hydrochloride is sparingly soluble in water and melts at 235° C. to 236° C., the free ketone base melts at 98° C.

6. 1-cyclohexyl-4-phenyl-piperidyl-4-ethyl-ketone

If in the preceding Example 5 the 83 parts of 1-benzyl-4-phenyl-piperidine-4-carboxylic acid nitrile are replaced by 84 parts of 1-cyclohexyl-4-phenyl-piperidine-4-carboxylic acid nitrile and the process is otherwise carried through in the same manner as in Example 5, the 1-cyclohexyl-4-phenyl-piperidyl-4-ethylketone hydrochloride is obtained. The salt may be recrystallized from water; it forms colorless crystals melting at 245° C. to 246° C. The yield amounts to 85 parts. The free base melts at 80° C.

In an analogous manner there may be obtained from 1 - methyl-4-phenyl-piperidine-4-carboxylic acid nitrile by the action of propyl-magnesium-bromide the 1-methyl-4-phenyl-piperidyl-4-propyl-ketone, base, colorless oil, boiling at 159° C.–165° C. under a pressure of 5 mm.; hydrochloride, colorless crystalline powder melting at 115° C. to 117° C., phosphate, colorless crystalline powder melting at 152° C. to 157° C.; from isopropyl-magnesium-bromide the 1-methyl-4-phenyl-piperidyl-4-isopropyl-ketone, colorless oil boiling at 167° C. to 168° C. under a pressure of 7 mm.; phosphate, colorless crystalline powder melting at 199° C. to 202° C.; from allyl-magnesium-bromide the 1-methyl - 4 - phenyl-piperidine-4-allyl-ketone, boiling at 166° C. to 170° C. under a pressure of 3 mm.; hydrochloride, colorless crystals melting at 193° C. to 196° C. from isobutyl-magnesium-chloride the 1-methyl-4-phenyl-piperidyl-4-isobutyl-ketone, oil boiling at 155° C. to 160° C. under a pressure of 5 mm.; phosphate, colorless crystalline powder melting at 166° C. to 167° C.; from hexyl-magnesium-bromide the 1-methyl-4-phenyl-piperidyl - 4 - n-hexyl-ketone, oil boiling at 183° C. to 186° C. under a pressure of 4 mm.; phosphate crystallizes from water as colorless crystals containing crystal water; from cyclohexyl-magnesium-bromide the 1-methyl-4-phenyl-piperidyl - 4 - cyclohexyl-ketone, viscous oil boiling at 192° C. to 200° C. under a pressure of 5 mm.; hydrochloride, colorless crystalline powder, decomposition point above 204° C.; from 4-methoxyphenyl-magnesium-bromide the 1-methyl-4-phenyl-piperidyl-4-(4,methoxy-phenyl)-ketone, boiling over at about 215° C. under a pressure of 2 mm. as an oil which on cooling solidifies in a glassy form; hydrochloride, colorless crystalline powder melting at 237° C. to 238° C.; from beta-phenyl-ethyl-magnesium-chloride the 1-methyl-4-phenyl-piperidyl-4-beta-phenyl-ethyl-ketone hydrochloride crystallizes from water so as to contain crystal water. Melting point 75° C. to 78° C.

I claim:
1. The process which comprises reacting a compound of the following formula

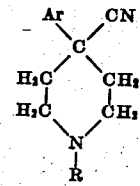

wherein Ar stands for aryl and R stands for a hydrocarbon radical with a magnesium-organic compound and treating the intermediate product thus obtained with a dilute acid.

2. The process which comprises reacting a compound of the following formula

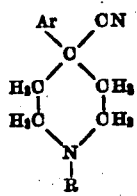

wherein Ar stands for aryl and R stands for a hydrocarbon radical with a compound of the general formula: R—Mg—Hlg wherein R stands for a hydrocarbon radical and Hlg stands for halogen and treating the intermediate product thus obtained with a dilute acid.

3. The process which comprises reacting a compound of the following formula

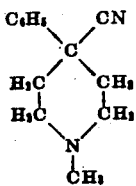

with a compound of the general formula: R—Mg—Hlg wherein R stands for a hydrocarbon radical and Hlg stands for halogen and treating the intermediate product thus obtained with a dilute acid.

4. The process which comprises reacting a compound of the following formula

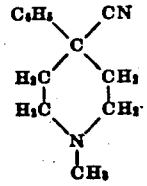

with a compound of the general formula R—Mg—Hlg wherein R stands for an alkyl radical of 1 to 6 carbon atoms and Hlg stands for halogen and treating the intermediate product thus obtained with a dilute acid.

5. The products of the following formula

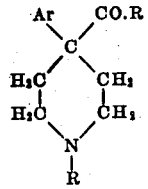

wherein Ar stands for aryl and R stands for a hydrocarbon radical.

6. The products of the following formula

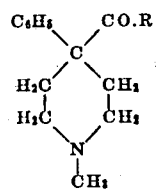

wherein R stands for a hydrocarbon radical.

7. The products of the following formula

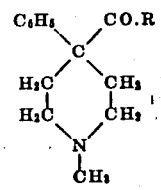

wherein R stands for an alkyl radical of 1 to 6 carbon atoms.

8. 1-methyl-4-phenyl-piperidyl-4-methyl-ketone.

9. 1-methyl-4-phenyl-piperidyl-4-ethyl-ketone.

10. 1-methyl-4-phenyl-piperidyl-4-phenyl-ketone.

OTTO EISLEB.